Jan. 23, 1968 H. R. BECK 3,365,156
ELECTRICAL BOX ASSEMBLY AND MOUNTING BRACKET
Filed April 16, 1965

INVENTOR
HAROLD RICHARD BECK
BY
Etherbridge, O'Neill & Aubel
Attys.

United States Patent Office 3,365,156
Patented Jan. 23, 1968

3,365,156
ELECTRICAL BOX ASSEMBLY AND
MOUNTING BRACKET
Harold Richard Beck, 134 W. 119th St.,
Chicago, Ill. 60628
Filed Apr. 16, 1965, Ser. No. 448,740
5 Claims. (Cl. 248—205)

The present invention generally relates to a supporting strap for adjustably supporting an electrical outlet box from a wall stud or joist and to a novel electrical box and strap assembly.

An object of the present invention is to provide a means and improved electrical box assembly for adjustably mounting the box to a wall stud, ceilling joist and the like.

An object of the present invention is to provide a supporting strap having channels formed thereon in opposing relation for adjustably receiving projecting flanges on an electrical outlet box or the like.

Another object of this invention is to provide an outlet box and supporting strap or bracket therefor together with thumb screws or the like for securing the outlet box adjustably on the bracket.

A further object of the present invention is to provide a mounting strap in accordance with the preceding objects having inturned end flanges.

Yet another object of this invention is to provide a mounting strap having struck-out flanges forming guides for an outlet box.

Still another object of the present invention is to provide an electrical box and supporting strap therefor which is easy to install quickly and repeatably adjustable, safe in use and generally inexpensive to manufacture.

These and other objects, features and advantages of the present invention will become subsequently apparent and reside in the details of construction and operation as more fully hereinafter described and claimed, reference being had to the accompanying drawings forming a part thereof, wherein like numerals refer to like parts throughout, and in which:

Referring now specifically to the drawings, a preferred mounting strap 10 for adjustably mounting an electrical box to a wall stud or joist is constructed of substantially rigid material, such as sheet metal, plastic or the like and includes holes 12 for the reception of nails 14 or other fasteners for securing the strap 10 to a wall stud 16. The end edges of strap 10 are inturned at 18 to define a pair of guides formed by inwardly open channels.

Figure 1:
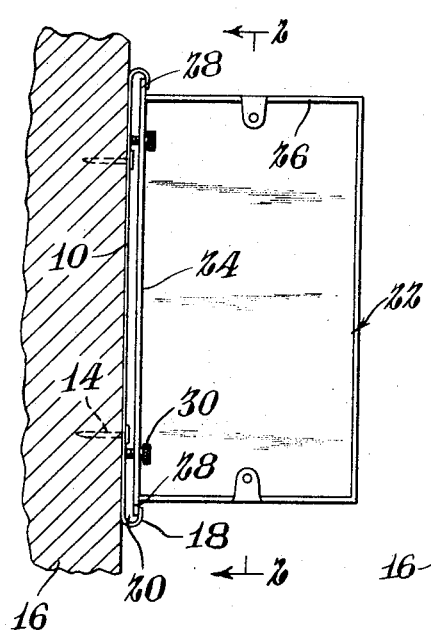
FIGURE 1 is a front plan view of the support strap and outlet box assembly of the present invention.

A polygonal electrical box such as an outlet box 22 is shown in FIG. 1 supported adjustably by the strap 10 and includes one side wall 24 extending beyond the end walls 26. The extending ends of the side wall 24 define a pair of spaced flanges 28 freely slidably received in the channels 20. Thumb screws 30 with knurled heads are screw threaded through side wall 24 into abutting engagement with the mounting strap 10 for locking the box 22 in any one of a plurality of adjusted positions relative to the stud 16.

Thus the box 22 can be slid horizontally with the flanges 28 in the channels 20 to a position wherein the box is properly aligned for disposition of a portion thereof in a cut out portion of wall board and the like. Once the box is so positioned, then the screws 30 may be screw threaded to lock the box to the strap.

Figure 2:
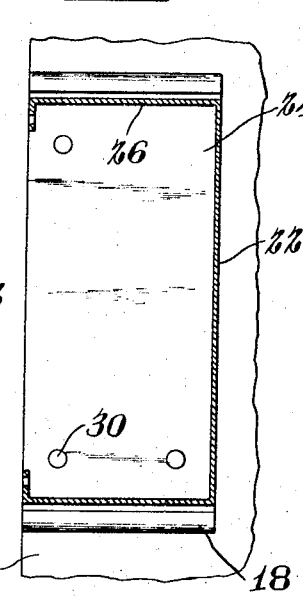
FIGURE 2 is a vertical sectional view taken along the center line of the box.
Figure 3:
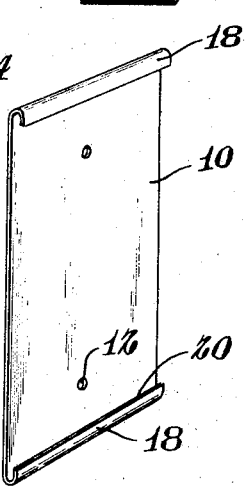
FIGURE 3 is a perspective view of the mounting strap.
Figure 4:
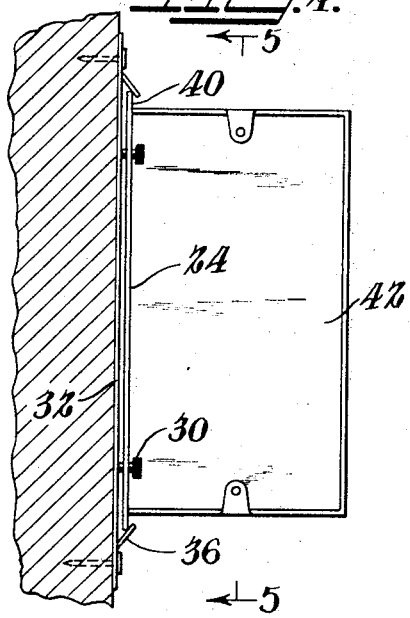
FIGURE 4 is a front plan view of another embodiment of the invention.
Figure 5:
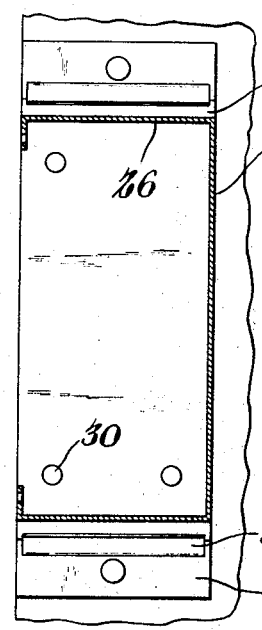
FIGURE 5 is a sectional view of the assembly taken along the center line of the box employed in FIGURE 4.
Figure 6:
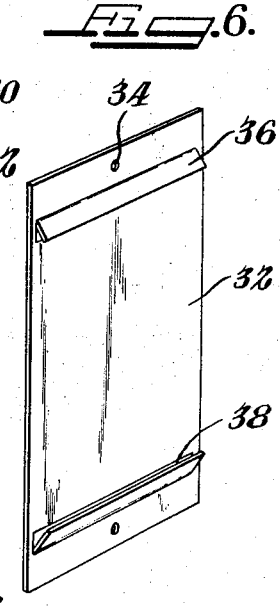
FIGURE 6 is a perspective view of the mounting strap used in FIGURE 4.

The embodiment of the invention illustrated in FIGS. 4–6 includes a mounting strap 32 having mounting holes 34 and a pair of outwardly struck inwardly inclined flanges 36 which define channels 38 for receiving flanges 40 on an electrical box 42 identical to the box 22 in FIGS. 1–3 and the same identifying numerals are used.

When installing an electrical box, it is only necessary to nail or otherwise secure the strap vertically to the wall stud or horizontally to the ceiling cross beam or joist, for example, with the front edge of the strap flush with the front edge of the wall stud in the case of wall studs. Then it is only necessary to slide the box 22 in with the flanges thereon received in the channels. When the box is in proper position, the thumb screws are then tightened for securing the box in place. If later it is necessary to re-align the box relative to the strap, this can be easily done by untightening the thumb screws and sliding the box flanges in the channels 20 or 38 to the new position and then re-tightening the thumb screws.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

I claim:
1. An electrical box assembly for adjustably mounting an electrical box to a wall stud and the like comprising an electrical box, first guide means carried by said box, a box supporting strap device adapted to be mounted in a plurality of positions on a stud, second guide means carried by said device for engagement with said first guide means for guiding supported movement of said box along a predetermined path of movement of said box with respect to said strap device, said first and second guide means permitting said supported movement of said box relative to said device for freely adjusting the position of said box relative to said device along the predetermined path of movement of said box, and means cooperable with said first and second guide means carried by the box for engagement with said device to bias said first guide means of the box against the second guide means of the device for releasably locking the box in any position along said path.

2. The assembly of claim 1 wherein the means cooperable with the second guide means for biasing the box with respect to the device comprises screw means carried by the box.

3. The assembly of claim 1 wherein said guide means of said device includes a pair of spaced inturned flanges inclined toward each other, said flanges being located opposite ends of said box for engagement with said first guide means carried by said box.

4. The assembly of claim 3 wherein said inturned flanges define channels for receiving said first guide means of said box to permit adjustment of the position of said box relative to said channel defining flanges.

5. The assembly of claim 4 wherein said securing means comprise screw means threadedly carried by the box for engagement with said strap device to bias said first guide means of the box against the spaced inturned flanges of the device for releasably locking the box in any position along said path.

References Cited
UNITED STATES PATENTS

| | | | |
|---|---|---|---|
| 1,456,385 | 5/1923 | Kvarnstrom | 220—4 |
| 2,023,083 | 12/1935 | Knell | 220—3.9 |
| 2,233,548 | 3/1941 | Mroziok | 248—221 |
| 2,644,600 | 7/1953 | Senif | 220—3.9 |
| 2,875,915 | 3/1959 | Buckels | 220—3.7 |
| 3,029,870 | 4/1962 | Heller | 160—369 |

JOHN PETO, *Primary Examiner.*

CLAUDE A. LEROY, *Examiner.*

J. F. FOSS, *Assistant Examiner.*